United States Patent [19]
Delaney

[11] 3,829,921
[45] Aug. 20, 1974

[54] TAP WITH REPLACEABLE CUTTING INSERT

[76] Inventor: Edward J. Delaney, Valley Pky. E., Joliet, Ill. 60433

[22] Filed: Apr. 16, 1973

[21] Appl. No.: 351,256

[52] U.S. Cl. .............................................. 10/141 R
[51] Int. Cl. .............................................. B23g 5/06
[58] Field of Search .......... 10/141 R, 142, 143, 144, 10/145; 29/96, 103; 408/188

[56] References Cited
UNITED STATES PATENTS

| | | | |
|---|---|---|---|
| 150,197 | 4/1874 | Siegfried | 10/142 |
| 2,227,281 | 12/1940 | Smith | 10/142 |
| 3,500,523 | 3/1970 | Cashman et al. | 29/96 |
| 3,597,104 | 8/1971 | Salcumbe | 29/96 X |

FOREIGN PATENTS OR APPLICATIONS

| | | | |
|---|---|---|---|
| 320,809 | 10/1929 | Great Britain | 408/188 |
| 1,241,654 | 12/1959 | France | 408/188 |

Primary Examiner—Charles W. Lanham
Assistant Examiner—E. M. Combs
Attorney, Agent, or Firm—John L. Parker

[57] ABSTRACT

A tap for producing internal threads in pipes or the like is provided, including a holder portion, a generally flat insert having cutting threads along one of its edges, and means for releasably securing the cutting insert to the holder, with the securing means including a clamp member for engaging the insert against the holder and means for releasably fastening the clamp member and insert tightly against the holder. The securing means may also include a base member interposed between the insert and the holder and having a seat sized and shaped to fit and receive the insert. To enhance positive locking of the insert onto the holder, a slot may be provided in the holder for receiving a marginal portion of the insert to thereby counteract torque forces exerted on the insert from the thread cutting action. Cutting inserts which are particularly useful are generally square or triangular in shape and may be provided with cutting threads along any or all of their edges.

5 Claims, 6 Drawing Figures

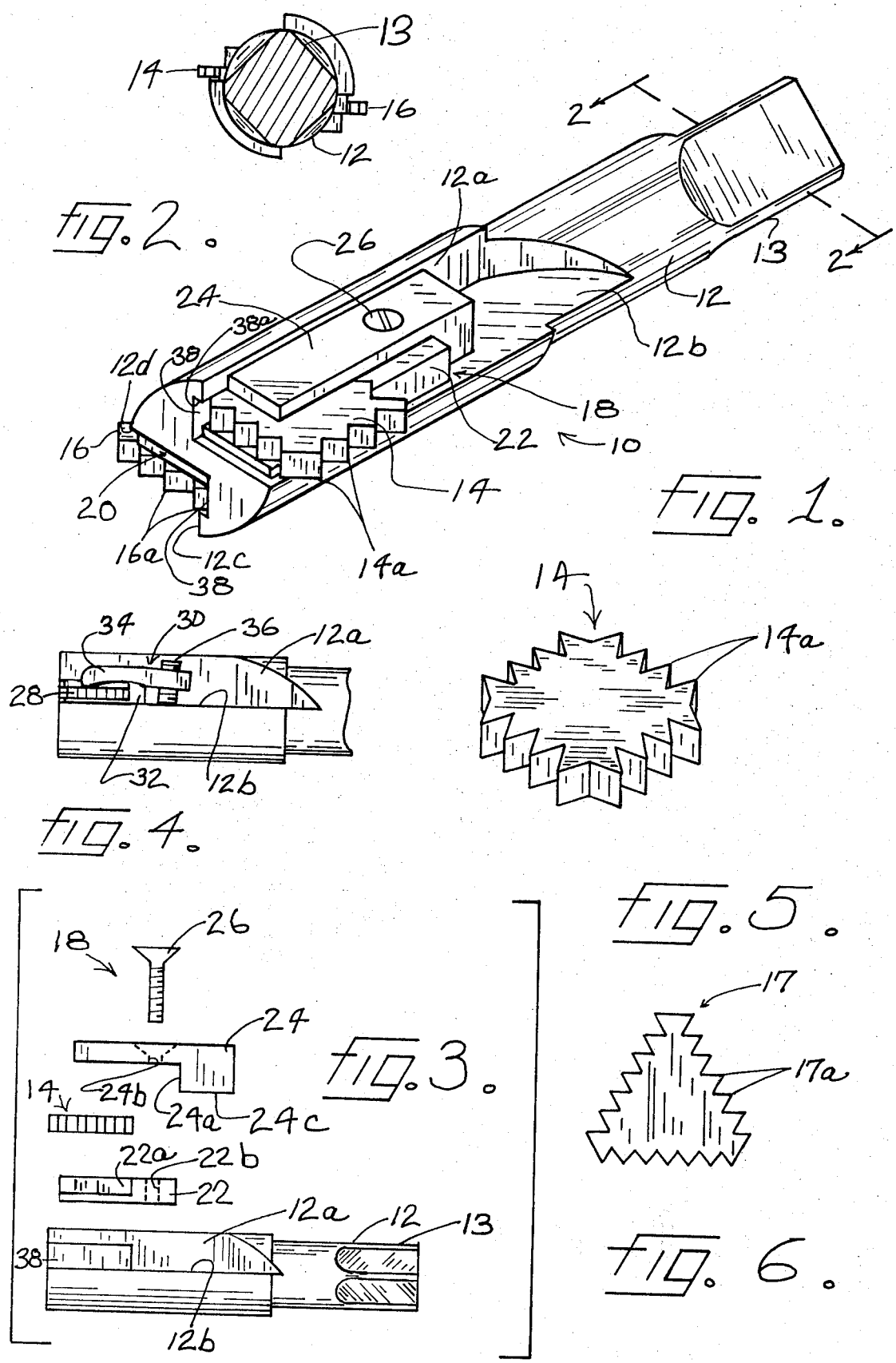

TAP WITH REPLACEABLE CUTTING INSERT

DESCRIPTION OF THE INVENTION

The present invention relates generally to a tap for producing internal threads in pipes or the like, and more particularly to such a tap having a cutting insert which may be removed and replaced after use.

Conventional taps are of elongated one-piece construction, having a thread cutting end and a holder end adaped to fit into a chuck or other tap holding device. Often the thread cutting end is longitudinally fluted to provide several (e.g., four) lands provided with cutting threads. When such a tap becomes dull after use, it is apt to chip, break, produce rough or poor threads, or cut oversize. It becomes necessary, then, to either replace the tap with a new one or to resharpen the old one. Neither alternative is desirable. Replacing the old tap is expensive since it is a precision cutting tool and a substantial amount of carefully machined metal must be discarded. Resharpening avoids the expense of discard, but is itself expensive and troublesome since the cutting portion of the tap must be ground to very close limits, usually on a tap grinding machine.

It is a general object of the present invention to overcome the disadvantages of conventional taps by providing a tap which, upon becoming dull, may be restored to fresh cutting capability without the need for resharpening and without having to discard the tap.

A related object is to provide a tap which presents thread cutting edges which may be replenished after use in minimum time, with little effort and at low cost. Another object is to provide a tap which extends tool life many times.

Other objects and advantages of the present invention will become apparent upon reading the following detailed description and upon reference to the drawings, in which:

FIG. 1 is a perspective view of a tap illustrating the features of the present invention.

FIG. 2 is a cross-sectional view taken along the line 2—2 in FIG. 1.

FIG. 3 is an exploded elevational view of a tap similar to that shown in FIG. 1, depicting the relationship between the various elements which make up the tap.

FIG. 4 is a fragmentary elevational view of an alternative form of the cutting end of the tap shown in FIG. 1.

FIG. 5 is a perspective view of an illustrative cutting insert of the type shown in FIG. 1.

FIG. 6 is a plan view of another illustrative cutting insert, similar to that shown in FIG. 5 but triangular rather than square in overall configuration.

While the invention is described in connection with certain preferred embodiments, it will be understood that I do not intend to limit the invention to those embodiments. On the contrary, I intend to cover all alternatives, modifications, and equivalents as may be included within the spirit and scope of the invention as defined by the appended claims.

Turning now to FIG. 1, there is shown an illustrative tap 10. It includes an elongated and generally cylindrically shaped holder 12, having an end portion 13 of square cross-section adapted to fit into a chuck or other tap holding device (not shown). Suitable motor driven means (also not shown) is provided for rotationally driving the chuck and tap 10 held therein when the tap is in use.

In accordance with the invention, the tap 10 includes a pair of cutting inserts 14, 16 along with associated means 18, 20, respectively, for removably clamping the cutting inserts onto the tap holder 12. For receiving the inserts 14, 16 and their associated clamping means 18, 20, the tap holder 12 is provided with a pair of elongated cutaway portions, located on opposite sides of the holder, and defined in this instance by surfaces 12a and 12b disposed perpendicular to each other (one cutaway portion), and by surfaces 12c and 12d similarly disposed with respect to each other (the other cutaway portion).

When clamped in place on the holder 12, the inserts present radially outwardly extending teeth or cutting threads 14a, 16a for engagement with an internal pipe or other surface (not shown) to be threaded.

As shown (see FIG. 3), the clamping means 18 associated with cutting insert 14 includes a flat base member 22 for cradling the insert 14, a J-shaped clamping member 24 for overlying the insert, and a machine screw or other suitable fastener 26 for securing the parts together. In this instance, the base member 22 is provided at one end with a recess or seat 22a for receiving the insert 14, and at the other end with an opening 22b through which the fastener 26 passes. The clamping member 24 has a recess 24a for receiving both the insert 14 and the base member 22 when in an overlying clamping position, and is provided with an opening 24b through which the fastener passes. The clamping member 24 is provided with a bottoming surface 24c for engagement with the holder surface 12b.

Thus, when the clamping means 18 and insert 14 are fully assembled, the base member 22 is positioned flatly on the holder surface 12b with its recess 22 a facing upwardly, the insert 14 is cradled within the recess 22a, the clamping member 24 overlies the base 22 and insert 14 so that its bottoming surface 24c flatly engages the holder surface 12b, and the fastener 26 extends through the openings 24b in the clamp and 22b in the base and into screw engagement (not shown) with the holder 12. Upon tightening of the screw 26 the entire clamping means-insert combination 18, 14 is firmly secured to the tap holder 12, and the cutting threads or teeth 14a are in proper position for use. Clamping means 20 is like means 18.

As shown in FIG. 5, the cutting insert 14 may be shaped as a thin metal chip of generally square configuration. One of the advantages of the square shape is that each of the four edges of the insert may be provided with cutting teeth 14a. When the teeth on one edge become worn through use, the clamping means may be released and the insert may be rotated 90° and reclamped in place to thereby provide a second, fresh cutting edge for use in the threading operations. When the second edge has been worn, the third and later the fourth fresh edges may be used in succession. In this way the life of the tap itself is not only indefinitely extended through use of the cutting insert, but the life of the insert itself is extended up to four times through use of the four separate cutting edges.

The cutting insert may, within the scope of my invention, include any number of sides or edges so long as each is long enough to perform an adequate thread cutting function. For example, an insert 17 of thin, flat triangular configuration may be provided, having cutting teeth 17a on each of three cutting sides. Or, a two-sided, or five or six sided, insert (not shown) could be used.

If an insert configuration other than square or rectangular is used, it may be desirable to shape the recess 22a in the base 22 complementarily to facilitate secure clamping of the insert on the tap holder. For example, when using the triangular insert 17 it may be desirable to form the recess 22a in a complementary V-shape (when looking down on the base 22 shown in FIGS. 1 and 3) so that the insert snugly fits within the recess.

An alternative form of insert clamping means is illustrated in FIG. 4. There, an insert 28 is held in place by clamping means 30 which includes a flat base member 32 provided with a recess (not shown) for cradling the insert, an overlying clamping member 34 and screw-threaded fastener means 36 for securing the clamp 34 tightly against the insert. In this instance the fastener 36 does not extend through the base 32, being screwthreaded directly into the tap holder 12. Set screw or other suitable means (not shown) may be employed to releasably secure the clamp 34 to the fastener 36. Release permits the clamp 34 to be swung into or away from pressing engagement against the flat side of the insert 28. As shown, preferably the fastener 36 is inclined slightly in a direction away from the cutting end of the tap. This slight inclination coupled with a slightly dished contour of the underside of the clamp 34 acts to enhance the swing and frictional engagement between the clamp 34 and the insert 28.

One of the features of the invention is the provision on the tap holder 12 of means for counteracting the torque produced by thread cutting action when the tap is in use, thereby avoiding slippage or loosening of the cutting insert with respect to the holder. To this end, the holder surfaces 12a and 12c are each provided with a longitudinal recess or slot 38 located at or near the cutting end of the holder and being at least coextensive in length with the cutting insert. Each slot 38 is defined in part by a longitudinal lip or surface 38a for engaging the margin of the cutting insert when the insert is clamped in place on the holder (see FIG. 1). Thus, when in use, the edge of the cutting insert opposite that being used to cut threads is firmly sandwiched between the holder surface 12b and the lip 38a, thereby counteracting torque produced by the thread cutting action.

As will be seen, my invention through utilization of easily replaceable, throw-away type cutting inserts makes it possible to maintain long tap life with consequential low thread cutting production costs. Yet the insert clamping arrangement which forms a part of my invention lends assurance that positive and immediate "lock-in" of each insert to the holder will be achieved following insert replacement or rotation (to present a fresh cutting edge). Moreover, the feature of providing multiple cutting edges on each insert, usable in sequence as they become dull, further significantly reduces threading costs.

I claim as my invention:

1. A thread cutting tap comprising, in combination, a holder having one portion adapted to be gripped by a chuck or the like and another generally cylindrical portion including a pair of flat, generally radially disposed surfaces each extending substantially across the cylinder and spaced 180° apart from one another, a pair of generally flat inserts each having threads for cutting metal or the like along at least two of its edges and each substantially overlying and arranged generally parallel with one of the flat surfaces on the holder with its cutting threads disposed in operative cutting position, and means for removably securing each of said inserts to the holder, said securing means including a clamp member disposed to overlie and clampingly engage each of said flat inserts against the holder and means for releasably fastening the clamp member and insert tightly against the holder.

2. A thread cutting tap as defined in claim 1 in which the securing means also includes a base member interposed between the insert and the flat surface on the holder, the base member having a seat sized and shaped to fit and receive the insert.

3. A thread cutting tap as defined in claim 2 in which the insert is of generally square shape and the seat of the base member is also square in shape.

4. A thread cutting tap as defined in claim 2 in which the insert is of generally triangular shape and the seat of the base member is V-shaped.

5. A thread cutting tap as defined in claim 2 in which the clamp member is disposed to overlie both the insert and the base member.

* * * * *